United States Patent [19]
Cavazos et al.

[11] 3,819,517
[45] June 25, 1974

[54] FIRE RETARDANT COMPOSITIONS

[75] Inventors: Antonio M. Cavazos, Carrolton; Donald W. Kelley, Garland, both of Tex.

[73] Assignee: Thuron Industries, Inc., Dallas, Tex.

[22] Filed: July 3, 1972

[21] Appl. No.: 268,617

[52] U.S. Cl........ 252/8.1, 106/15 FP, 117/DIG. 10, 117/138, 252/88
[51] Int. Cl................................................. C09k 3/28
[58] Field of Search............ 252/8.1, 88; 106/15 FP; 117/DIG. 10, 138

[56] References Cited
UNITED STATES PATENTS

| | | | |
|---|---|---|---|
| 755,357 | 3/1904 | Chesebrough | 252/88 |
| 1,749,317 | 3/1930 | Chevalier | 252/88 |
| 1,916,163 | 6/1933 | Worth | 252/88 |
| 2,935,471 | 5/1960 | Aarons et al. | 252/8.1 |
| 3,391,079 | 7/1968 | Greenblatt | 252/8.1 |
| 3,560,381 | 2/1971 | Winters, Jr. et al. | 252/8.1 |

*Primary Examiner*—Mayer Weinblatt

[57] ABSTRACT

Compositions which impart the properties of fire proofing and dirt and dust pick up for natural and synthetic fibrous materials comprising a puffed alkali metal borate of low density, an ammonium salt and an oil, said compositions providing a one step method for imparting said properties.

10 Claims, No Drawings

3,819,517

FIRE RETARDANT COMPOSITIONS

This invention relates to novel compositions for imparting the properties of fire proofing and dirt-dust pick up to materials made of natural and synthetic fibers such as walk-in rugs or mats and to a novel process using said compositions.

Briefly stated, in one embodiment of the present invention the novel compositions comprise a puffed alkali metal borate, an ammonium salt, and an oil, as the essential components.

Prior to the present invention, certain problems existed in meeting governmental specifications for imparting the required degree of fire proofing and dirt-dust pick up for synthetic and natural fibrous walk-in mats used in public places such as institutions, hotels and restaurants.

In the prior art, a multi-step process is employed wherein the mat is first treated with oil to provide the property of dirt-dust pick up and as a separate process treatment of the oil impregnated mat with an alkali metal borate-boric acid mixture to impart fire proofing. The disadvantages of the prior art are that often times insufficient oil take up occurred, inferior fire proofing, instability of the treated mat and deterioration of the mat fibers due to the boric acid. Another disadvantage of the prior art is that it is expensive due to the requirements of the components used and the use of two step process which requires both greater machine and labor time.

The present invention provides novel compositions which overcome the disadvantages of the prior art. In one embodiment of the present invention, the novel composition comprises a puffed alkali metal borate, an ammonium salt and oil, as the essential components. In a second embodiment of the present invention, the novel composition comprises the three essential components and a dry granular filler. In each embodiment, the composition possesses the meritorius charactistics of being a freely flowable powder mixture, water soluble, and useable in a one-step process for effectively imparting a high degree of fireproofing an dirt-dust pick up in excess of government specifications. In each embodiment, there may be included in the composition small amounts of optional components such as urea, dicyandiamide or the like as a color and heat stabilizer, bactericides, bacteristats, fungicides, fungistats, dyes, perfumes, de-odorizers, anti-static agents and surfactants.

Of the essential components mentioned above, the puffed alkali metal borate can be puffed lithium or potassium tetraborate or puffed sodium tetraborate. Preferably, there is used puffed borax. It is essential that the borate be a puffed borate in order to provide adequate water solubility, to take up sufficient oil to impart sufficient dirt-dust pick up to the treated material, and to provide a free flowing composition. The puffed alkali metal borate should have a density within the range of about 3 pounds per cubic foot to 28 pounds per cubic foot, preferably about 4 to 20 pounds per cubic foot. The amount of puffed alkali metal borate employed is within the range of about 20 to 40 percent, by weight of the total composition, and preferably from about 25 to 35 percent.

The ammonium salt component can be selected from diammonium hydrogen phosphate, ammonium dihydrogen phosphate, ammonium sulfate, ammonium sulfamate and ammonium borate and mixtures thereof. The ammonium salt or a mixture of ammonium salts is employed within the range of about 8 to 22 percent, by weight of the total composition, and preferably from about 10 to 20 percent.

The oil component of the compositions of the present invention can be selected from paraffinic oils, paraffinic/aromatic oils and aromatic oils. The viscosity of the oil is preferably such that the oil is pourable at room temperature or an oil that is solid at room temperature which can be liquified on heating prior to addition of the oil to the composition. In the case of a solid oil, it should have a melting point lower than the aqueous treating bath in which the compositions of the present invention are used such as about 25°C to 45°C or higher. The choice of the particular oil to be employed is within the ordinary skill of the art using routine experimentation giving due consideration to the flash point, viscosity, General Aniline Point, temperature of the aqueous treating bath to be used, and fibrous material to be treated. An oil of high flash point such as 80°C or higher is desirable but not required due to the improved take up of the fire proofing components of the composition of the present invention. A high General Aniline Point such as 220 or higher is desirable in the case of many fibrous mats having a polymeric backing such as latex to prevent curling as is known in the art. The boiling point of the oil should be higher than the temperature of the drying cycle used in drying the treated fibrous material which may range from about 35°C to 120°C. In the practice of the present invention, there is generally employed a paraffinic or paraffinic/naphthenic oil having a Saybolt viscosity (100°F)) of about 100 to 260, more usually an oil having a Saybolt viscosity (100°F) of about 100 to 200. The amount of oil in the composition should be within the range of about 35 to 60 percent, by weight of the total composition, preferably about 40 to 55 percent.

A dry filler can be included in the compositions of the present invention. The dry filler can be any finely divided mineral material which is inert in the composition, does not cause discoloration of the fabric and possesses oil absorbency such as finely divided silica, diatomaceous earth, and the like. A suitable filler is Celite 209 which is a dehydrated natural diatomite having a particle size distribution 91% finer than ten microns of which 78% is retained by 60 mesh screen and 19% retained by 100 mesh screen. The dry filler can be present in the amount of from 0 to about 15 percent, by weight of the composition, usually not more than about 5 percent.

In the practice of the present invention in preparing the novel compositions, the puffed alkali metal borate, dry filler (if used) and ammonium salt are usually first mixed only sufficiently to blend these components such as in a Marion blender. It is important in mixing these components to mix them only sufficiently to obtain a blend in order to minimize reducing the puffed borate to a powder. Thus, in the preferred practice, the shortest mixing time possible should be employed. The reason for this is that any reduction in the puffed texture of the puffed borate results in a reduction of oil take up by the puffed alkali metal borate. The oil component is then added and mixed until evenly distributed.

In addition, a surfactant can be included which improves the oil take-up and thus allowing for use of less oil in the composition without sacrificing desirable dirt-dust pick up qualities of the treated mat. Suitable surfactants include non-ionic surfactants liquid or solid such as polyalkylene glycol ethers and condensation products of ethylene and propyleneoxides, e.g., Plurafac A-24 and A-38 and Pluronic F-68 and L-61 of Wyandotte; Triton N-57, N-111, X-207 and X-100 of Rohm and Haas; and Brij 35 Renex 20 and 688 of Atlas. The amount surfactant employed can range from zero to about 5%, by weight, of the total composition.

The following examples are provided to illustrate the practice of the present invention. Parts and percentages are by weight, unless otherwise specified.

EXAMPLE 1

Into a Marion blender (horizontal cyclinder with vertical paddle blades on a horizontal shaft) is added 36 lbs of puffed borax (4 lbs per cubic foot) and 12 lbs of Celite 209 (diatomaceous earth). The two components are mixed briefly at about 15 rpm without reducing the puffed borax to a powder. Diammonium hydrogen phosphate (15 lbs) is added, mixed briefly (less than one minute) and then 52 lbs of Pale oil (viscosity 100–115 SUS at 100°F, Analine Point 145–150, Flash°F, COC of 300 min.) is added quickly and mixed until evenly distributed. A free flowing powder is obtained which does not cake on standing.

EXAMPLE 2

Following the procedure of Example 1, the following composition is prepared by first briefly blending puffed borax and diammonium hydrogen phosphate and then adding Pale Oil (100 viscosity) and mixing until evenly distributed.

|  | Parts |
|---|---|
| Puffed Borax (4 lbs/cu. ft) | 7 |
| Diammonium Hydrogen Phosphate | 3 |
| Oil - 100 viscosity (SUS) at 100°F | 10 |

In the same way, there is prepared the following composition of the present invention.

|  | Parts |
|---|---|
| Puffed Borax (4 lbs/cu. ft.) | 6 |
| Diammonium Hydrogen Phosphate | 3 |
| Diatomaceous Earth | 1 |
| Oil - 100 viscosity (SUS) at 100°F | 10 |

EXAMPLE 3

Following the procedure of Example 1, the following composition is prepared.

|  | Parts |
|---|---|
| Puffed Borax | 8.5 |
| Diammonium Hydrogen Phosphate | 3.5 |
| Oil* | 8.0 |

*Viscosity at 100°F of 105, Analine Point 220, Flash 375 Min., Viscosity Index 96 and 66% paraffins, 32% naphthenes and 2% aromatics.

EXAMPLE 4

A load of walk-in mats (cotton map with latex backing) weighing 400 lbs. is washed and rinsed in the usual manner in a commericial wash wheel. Warm water (100°–120°F) is added to the low level (i.e. about 4 inches of water), the wash wheel is started up and then 30 lbs. of the composition of the present invention such as the composition of Example 1 is added. Running is continued for 10–15 minutes. Excess solution is extracted centrifically by running the machine up to its maximum revolutions and then turning off the power. The load of mats is transferred to a hot air dryer which is run until mats are dry to the touch (temperature of dryer not to exceed 240°F).

Mops, dust-mops, etc. can be treated in the same way to provide flame-proofing and dirt-dust pick up properties. If the property of dirt-dust pick up is not desired, the oil component can be omitted and the composition used for imparting the property of flame proofing only to mats, mops, fabrics and the like.

What is claimed is:

1. A fire retardant composition consisting essentially of:
   about 20 to 40% of a puffed alkali metal borate selected from puffed lithium tetraborate, puffed potassium tetraborate, and puffed sodium tetraborate, having a density of about 3 to 28 pounds per cubic foot;
   about 8 to 22% of ammonium salt selected from the group consisting of diammonium hydrogen phosphate, ammonium dihydrogen phosphate, ammonium sulfate, ammonium sulfamate, ammonium borate and mixtures consisting of said ammonium salts;
   about 35 to 60% of a paraffinic or paraffinic/naphthenic oil having a Saybolt viscosity (100°F) of about 100 to 260; and
   0 to about 15% of a finely divided dry filler which is inert in the composition, does not cause discoloration of the fabric and possesses oil absorbency, said percentages by weight of the total composition.

2. A fire retardant composition according to claim 1 wherein said borate is puffed sodium tetraborate.

3. A fire retardant composition according to claim 2 wherein said puffed sodium tetraborate has a density of about 4 to 20 pounds per cubic foot and said ammonium salt is diammonium hydrogen phosphate, ammonium sulfate, ammonium sulfamate or ammonium borate.

4. A fire retardant composition according to claim 3 consisting essentially of
   about 25 to 35% of said puffed sodium tetraborate
   about 10 to 20% of said ammonium salt;
   about 35 to 55% of said oil; and
   zero to about 5% of said filler.

5. A fire retardant composition according to claim 4 wherein said ammonium salt is diammonium hydrogen phosphate.

6. A fire retardant composition according to claim 4 wherein said oil has an Aniline Point of at least 220.

7. A fire retardant composition according to claim 4 wherein said ammonium salt is diammonium hydrogen phosphate and said oil has an Aniline Point of at least 220.

8. A fire retardant composition according to claim 3 wherein said puffed sodium tetraborate has a density of about 4 to 8 pounds per cubic foot; said ammonium salt is diammonium hydrogen phosphate and said oil has an Aniline Point of at least 220.

9. A fire retardant composition according to claim 8 consisting essentially of about 30 to 35% puffed sodium tetraborate; about 12 to 18% diammonium hydrogen phosphate and about 40 to 50% oil.

10. A fire retardant composition according to claim 4 wherein said puffed sodium tetraborate has a density of about 4 to 8 pounds per cubic foot; said ammonium salt is diammonium hydrogen phosphate and said oil has an Aniline Point of at least 220.

* * * * *